(12) United States Patent
Vis (10) Patent No.: US 9,473,228 B2
(45) Date of Patent: Oct. 18, 2016

(54) VARIABLE DIVERSITY RX BANDWIDTH FOR SELF-ORGANIZING NETWORKS

(71) Applicant: QUALCOMM Incorporated, San Diego, CA (US)

(72) Inventor: Marvin Leroy Vis, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/170,148

(22) Filed: Jan. 31, 2014

(65) Prior Publication Data

US 2015/0222348 A1    Aug. 6, 2015

(51) Int. Cl.
| | |
|---|---|
| *H04B 7/08* | (2006.01) |
| *H04L 1/02* | (2006.01) |
| *H04B 1/10* | (2006.01) |
| *H04B 7/04* | (2006.01) |
| *H04W 52/42* | (2009.01) |
| *H04W 76/02* | (2009.01) |
| *H04W 84/18* | (2009.01) |
| *H04B 7/12* | (2006.01) |

(52) U.S. Cl.
CPC .......... *H04B 7/0825* (2013.01); *H04B 1/1036* (2013.01); *H04B 7/0413* (2013.01); *H04L 1/02* (2013.01); *H04W 52/42* (2013.01); *H04W 76/025* (2013.01); *H04B 7/12* (2013.01); *H04W 84/18* (2013.01)

(58) Field of Classification Search
CPC .......................... H04B 7/0413; H04B 7/0486
See application file for complete search history.

(56) References Cited

U.S. PATENT DOCUMENTS

| | | |
|---|---|---|
| 7,395,094 B2 | 7/2008 | Hovers et al. |
| 7,756,099 B2 | 7/2010 | Tao et al. |

(Continued)

FOREIGN PATENT DOCUMENTS

EP     1906538 A2    4/2008

OTHER PUBLICATIONS

International Search Report and Written Opinion—PCT/US2015/013328—ISA/EPO—Mar. 30, 2015.

(Continued)

*Primary Examiner* — Leon-Viet Nguyen
(74) *Attorney, Agent, or Firm* — Arent Fox LLP (57) ABSTRACT

In a wireless communication system, a method for configuring multiple antennas of a receiver may include configuring a primary antenna of the multiple antennas with a narrow band filter passing a selected uplink channel, and configuring a secondary antenna of the multiple antennas with a broad band filter passing multiple uplink channels. The receiver may sense the power of the multiple uplink channels received via the secondary antenna for use in controlling downlink power. Broad band configuration of the secondary antenna may be intermittent, interspersed with a narrow band filter configuration for diversity reception. The receiver may determine which of the multiple antennas is primary by sensing which antenna is receiving the strongest signal on the selected uplink channel. Different levels of automatic gain control may be applied to signals from respective different ones of the multiple antennas.

16 Claims, 6 Drawing Sheets

(56) References Cited

U.S. PATENT DOCUMENTS

| | | |
|---|---|---|
| 8,224,385 B2 | 7/2012 | Kanda |
| 2008/0227414 A1* | 9/2008 | Karmi et al. .................. 455/101 |
| 2008/0287163 A1* | 11/2008 | Skarby et al. ........ H04W 88/08 |
| | | 455/562.1 |
| 2009/0247229 A1 | 10/2009 | Teo et al. |
| 2011/0019715 A1* | 1/2011 | Brisebois ............. H04B 7/0626 |
| | | 375/130 |
| 2013/0017797 A1 | 1/2013 | Ramasamy et al. |
| 2013/0102267 A1* | 4/2013 | Haub et al. .............. H04B 1/10 |
| | | 455/296 |
| 2013/0165169 A1 | 6/2013 | Lee et al. |
| 2013/0295980 A1* | 11/2013 | Reuven et al. .... H04B 17/0055 |
| | | 455/514 |
| 2014/0010335 A1 | 1/2014 | Lee et al. |

OTHER PUBLICATIONS

3GPP TS 25.104 V11.8.0 (Dec. 2013), 3rd Generation Partnership Project, Technical Specification Group Radio Access Network, Base Station (BS) radio transmission and reception (FDD) (Release 11), pp. 1-111.

3GPP TS 25.141 V11.7.0 (Dec. 2013), 3rd Generation Partnership Project, Technical Specification Group Radio Access Network, Base Station (BS) conformance testing (FDD) (Release 11), pp. 1-231.

* cited by examiner

610 — CONFIGURING THE SECONDARY ANTENNA WITH THE BROAD BAND FILTER INTERMITTENTLY AT TIMES, AND AT OTHER TIMES CONFIGURING THE SECONDARY ANTENNA WITH A NARROW BAND FILTER FOR DIVERSITY RECEPTION

620 — PERFORMING THE DETERMINING IN RESPONSE TO DETECTING A DEFINED EVENT

630 — DETERMINING WHICH OF THE MULTIPLE ANTENNAS IS THE PRIMARY ANTENNA IS SUBJECT TO AN ADDED HYSTERESIS

710 — APPLYING DIFFERENT LEVELS OF AUTOMATIC GAIN CONTROL TO SIGNALS FROM RESPECTIVE DIFFERENT ONES OF THE MULTIPLE ANTENNAS

720 — APPLYING LESS GAIN TO SIGNALS FROM THE SECONDARY ANTENNA THAN TO SIGNALS FROM THE PRIMARY ANTENNA

FIG. 8

VARIABLE DIVERSITY RX BANDWIDTH FOR SELF-ORGANIZING NETWORKS

BACKGROUND

Aspects of the present disclosure relate generally to wireless communication systems, and more particularly, to techniques for receiving uplink signals in self-organizing cellular wireless networks.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. A base station may be, or may include, a macrocell or microcell. Microcells are characterized by having generally much lower transmit power than macrocells, and may often be deployed without central planning. In contrast, macrocells are typically installed at fixed locations as part of a planned network infrastructure, and cover relatively large areas.

The 3rd Generation Partnership Project (3GPP) Long Term Evolution (LTE) advanced cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs.

Wireless networks have seen increasing addition of small, low-power cells such as femto cells and pico cells. Many small cells are deployed on an ad hoc basis and are interconnected with macrocells making up planned wireless infrastructure. Management techniques for self-organizing networks of small cells (e.g., Qualcomm's (UltraSON)) may require uplink (UL) signal sensing by the small cell to manage transmission (TX) power levels of the small cell and its associated beacons. In UL sensing, the small cell measures the power of UL signals from access terminals in the vicinity, whether or not connected to the small cell. The small cell may then adjust its transmission power accordingly.

Measurement of UL signals on different carrier frequencies by the small cell requires use of small cell receiving (RX) resources. To avoid using a dedicated set of RX resources for UL sensing, prior solutions called for using a wide band analog low pass filter (LPF) in the receiver. The wide band LPF passed multiple UL signals in adjacent carriers for power management, enabling UL signal measurement without requiring use of a dedicated, separate RF receiving path for each UL measurement. However, this approach may not be optimal for next-generation networks that include broader base station classifications with higher TX power levels and more stringent minimum performance specifications (MPS), for example for adjacent channel (ACS) or "blocker" channel (±10 MHz, UMTS) cells. Such scenarios may place more stringent requirements on analog filtering and analog-to-digital conversion (ADC) dynamic range to avoid ADC saturation. Accordingly, new approaches for UL signal measurement by nodes of self-organizing networks (e.g., femtocells or Home NodeB's) are desired.

SUMMARY

Methods, apparatus and systems for using variable diversity RX bandwidth in self-organizing cellular wireless networks are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a receiver of a wireless communication system may perform a method for configuring multiple antennas. The method may include configuring a primary antenna of the multiple antennas with a narrow band filter passing a selected uplink channel, and configuring a secondary antenna of the multiple antennas with a broad band filter passing multiple uplink channels. The method may further include, by the receiver, sensing the power of the multiple uplink channels received via the secondary antenna for use in controlling downlink power. The receiver may be, or may include, an access point of the wireless communication system, for example, an eNB, femtocell, picocell, Home Node B, or other access point.

In an aspect of the method, the configuring the secondary antenna with the broad band filter may be performed intermittently at times, and at other times the receiver configures the secondary antenna with a narrow band filter for diversity reception. In other words, the receiver may configure the secondary with the broad band filter or with the narrow band filter, for different time periods.

In another aspect of the method, determining which of the multiple antennas is the primary antenna may be performed at least in part by sensing which of the multiple antennas is receiving the strongest signal on the selected uplink channel. For example, the antenna receiving the strongest signal over a defined prior period of time may be designated as the primary antenna. This operation of determining the primary antenna may be performed in response to detecting a defined event, for example, initiation of a call from a mobile entity. In another aspect, the process of determining which of the multiple antennas is the primary antenna may be subject to added hysteresis, for example, hysteresis tending to prevent the designation of primary antenna changing in response to transient fluctuations in signal strength.

In another aspect, the method may include applying different levels of automatic gain control to signals from respective different ones of the multiple antennas. For example, less gain may be applied to signals from the secondary antenna than to signals from the primary antenna.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a network entity, for example a small cell such as a femto-cell, picocell or Home NodeB. In some aspects, a mobile entity and network entity may operate interactively to perform aspects of the technology as described herein. Similarly, an article of manufacture may be provided, including a computer-readable storage medium holding encoded instructions, which when executed by a processor, cause a network entity to perform the methods and aspects of the methods as summarized above.

DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

New approaches may include redesigning the analog RX path to support a wider dynamic range, enabling use of a low noise gain range (GR) even with blocker channels passing through analog filters. In alternative diversity-exploiting approaches, a separate RX path may be used for UL sensing, exploiting one of available diversity RX paths (e.g., diversity RX in UMTS), either in a dedicated fashion or intermittently. In an intermittent approach, the diversity RX paths may be time-multiplexed, intermittently tuned to specific UL sensing frequencies for measurements, and when not tuned for UL sensing used for diversity reception.

In the diversity-exploiting approaches, narrow base band (BB) filtering may be deployed on an adaptively-determined "primary" antenna for normal UL reception, while conversely deploying wider BB filtering on an adaptively-determined secondary antenna for UL sensing. Determining which of multiple antennas is deemed to be primary may be accomplished by sensing which of the multiple antennas is receiving the strongest signal. Such sensing and determination of the primary/secondary antenna may be done at intervals or be event-triggered (e.g., performed upon call initiation). Changes in the deemed antenna ranking may be subject to substantial hysteresis to avoid unnecessary changes in the designation of primary and secondary antennas. Such hysteresis is not anticipated to introduce erroneous designations, because circumstances such as single-antenna blocker channels are not expected to be of practical significance.

In an aspect, separate coarse automatic gain control may be used for each different receiving path. Then, in a blocker scenario in the field, the secondary antenna may use less gain with an associated higher noise figure and still provide diversity. Although the performance of the secondary antenna alone would not be of sufficient quality to pass MPS for a single antenna, but it nonetheless may provide a diversity benefit. Also, improved blocker detection for the primary antenna may be achieved by setting the primary antenna gain ratio using UL signal measurements from the secondary antenna.

Benefits of diversity-exploiting approaches may include reducing or eliminating a need for a separate RX path for UL signal sensing. Further benefits may include reducing or eliminating a need to increase the dynamic range of the analog base band ADC to handle blocker channels, due to wider analog bandwidth for UL sensing on the primary antenna. In addition, benefits may include avoiding raising the noise floor past MPS requirements while retaining good antenna performance for ACS and blocker channel scenarios.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. The cdma2000 technology is covered by IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). The cdma2000 and UMB technologies are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
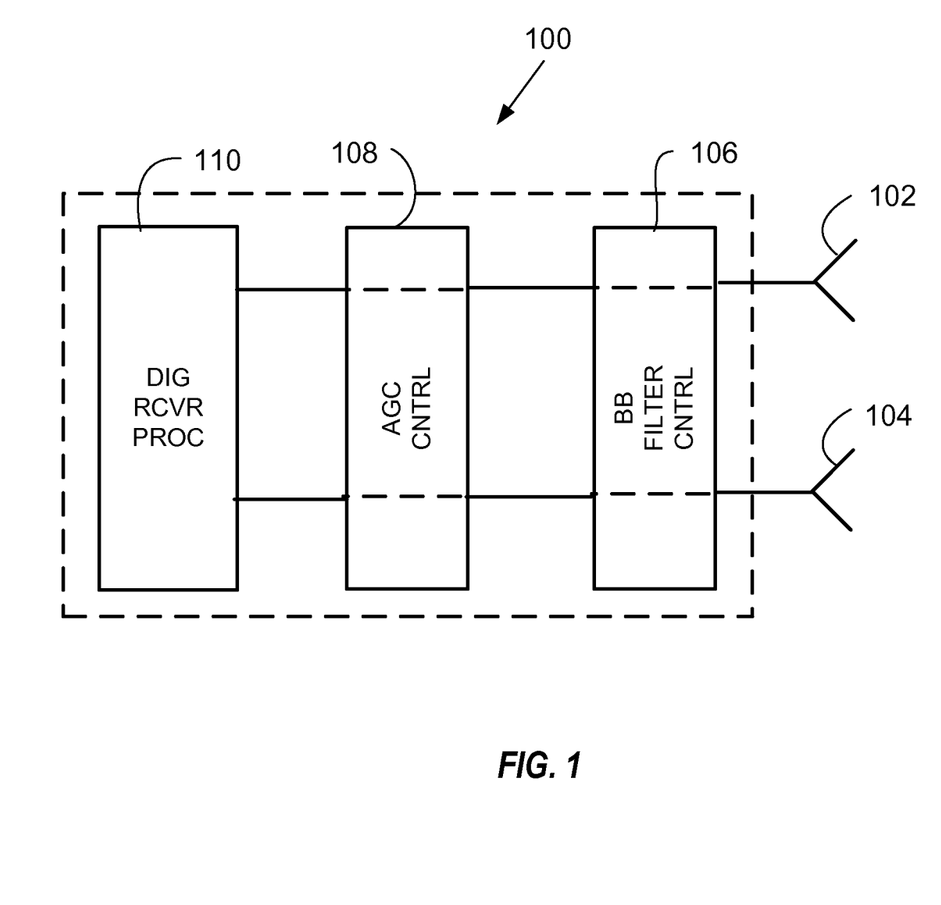
FIG. 1 is a block diagram conceptually illustrating an example of a receiver implementing separate RX paths with base band filtering and separate coarse automatic gain control.

The present technology may be implemented at one or more receiving nodes of a wireless communication system, for example as described herein. FIG. 1 conceptually illustrates an example of a receiver 100 implementing separate RX paths 102, 104 with base band filtering and separate coarse automatic gain control, and an example of the technique of redesigning an analog RX path to support a wider dynamic range that enables use of a low noise gain range (GR) even with blocker channels passing through analog filters. One of the separate RX paths 102, 104 may be used for UL sensing either in a dedicated fashion or intermittently. In an intermittent approach, the diversity RX paths may be time-multiplexed. Using a multiplexer (not shown), any one of the RX paths 102, 104 may be intermittently tuned to specific UL sensing frequencies for measurements, and when not tuned for UL sensing used for diversity reception.

In an alternative, the receiver 100 may implement a diversity-exploiting technique using a component for base band filtering 106 and for automatic gain control 108. In this approach, narrow BB filtering may be deployed on an adaptively-determined "primary" antenna (e.g., on RX path 102) for normal UL reception, while conversely deploying wider BB filtering on an adaptively-determined secondary antenna (e.g., on RX path 104) for UL sensing. Data passed through the reception paths 108, 106 may be provided to one or more digital signal processors 110 for application or control purposes.

Determining which of multiple antennas is deemed to be primary may be accomplished by sensing, for example at any one of controllers 110, 108 or 106, which of the multiple antennas is receiving the strongest signal. A controller may sense and determinate which of the RX paths 102, 104 is deemed the primary/secondary path at intervals or triggered by an event (e.g., performed upon call initiation).

In an aspect, separate coarse automatic gain control (AGC) may be used for each different receiving path via one or more AGC controllers 108. In a blocker scenario in the field, the secondary antenna may use less gain with an associated higher noise figure and still provide diversity. In such case, improved blocker detection for the primary antenna may be achieved by setting the primary antenna gain ratio using UL signal measurements from the secondary antenna.

Figure 2:
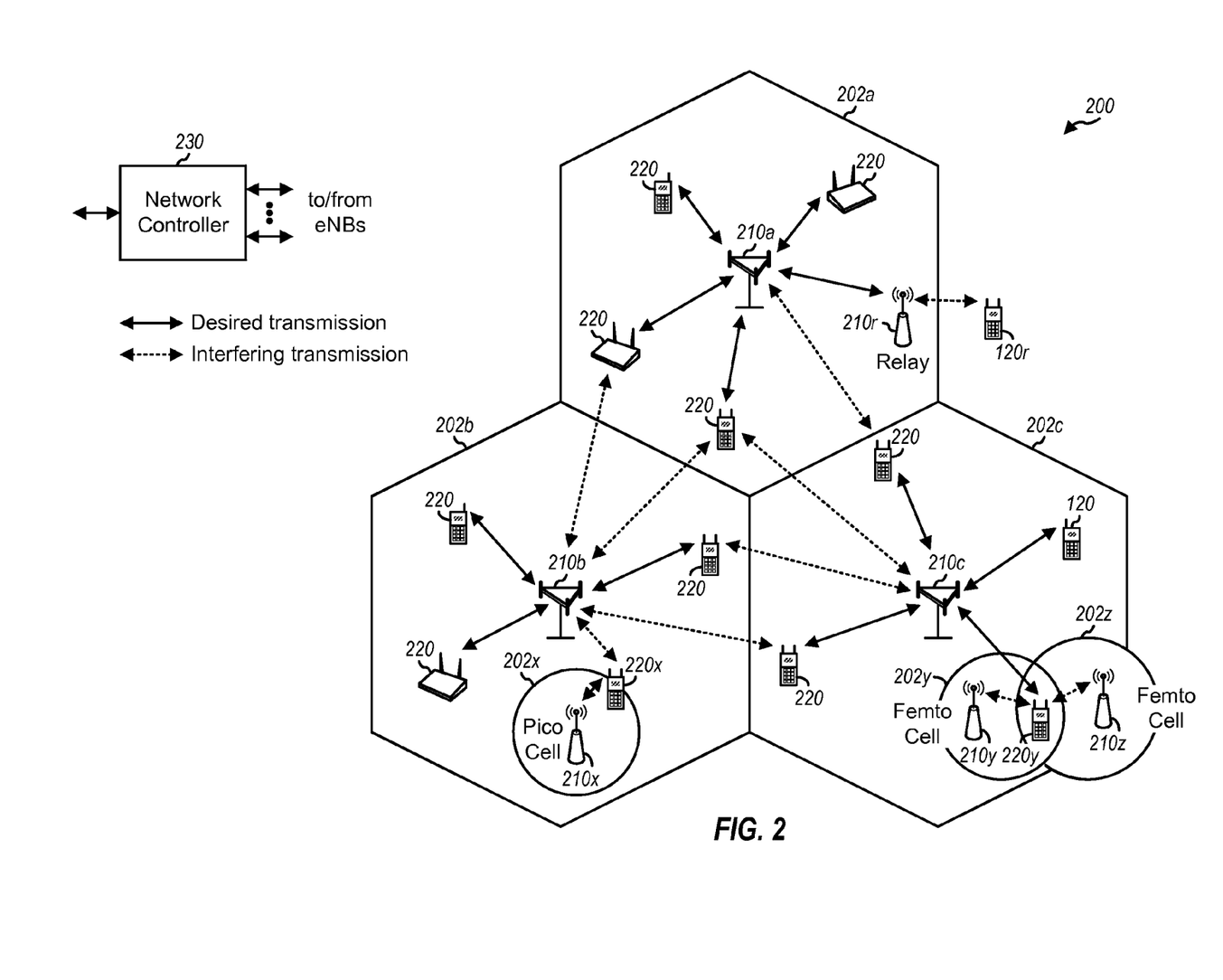
FIG. 2 is a block diagram conceptually illustrating an example of a telecommunications system.

FIG. 2 shows a wireless communication network 200, which may be an LTE network and which may include aspects of a self-organizing network, in which a receiver as shown in FIG. 1 may be implemented for receiving UL signals. The wireless network 200 may include a number of eNBs 210 and other network entities. An eNB may be a station that communicates with the UEs and may also be referred to as a base station, a Node B, an access point, or other term. Each eNB 210a, 210b, 210c may provide communication coverage for a particular geographic area. In 3GPP, the term "cell" can refer to a coverage area of an eNB and/or an eNB subsystem serving this coverage area, depending on the context in which the term is used. Each eNB 210a, 210b, 210c may be configured as an UL receiver 100 shown in FIG. 1.

An eNB may provide communication coverage for a macro cell, a pico cell, a femto cell, and/or other types of cell, some or all of which may be deployed in an unplanned fashion. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 2, the eNBs 210a, 210b and 210c may be macro eNBs for the macro cells 202a, 202b and 202c, respectively. The eNB 210x may be a pico eNB for a pico cell 202x. The eNBs 210y and 210z may be femto eNBs for the femto cells 202y and 202z, respectively. An eNB may support one or multiple (e.g., three) cells. The femto cells and pico cells are examples of small cells. As used herein, a small cell means a cell characterized by having a transmit power substantially less than each macro cell in the network with the small cell, for example low-power access nodes such as defined in 3GPP Technical Report (T.R.) 36.932 section 4.

The wireless network 200 may also include relay stations 210r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 2, a relay station 210r may communicate with the eNB 210a and a UE 220r in order to facilitate communication between the eNB 210a and the UE 220r. A relay station may also be referred to as a relay eNB, a relay, or other terminology.

The wireless network 200 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 200. For example, macro eNBs may have a high transmit power level (e.g., 5 to 20 Watts) whereas pico eNBs, femto eNBs and relays may have a lower transmit power level (e.g., 0.1 to 2 Watts).

The wireless network 200 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 230 may couple to a set of eNBs and provide coordination and control for these eNBs. The network controller 230 may communicate with the eNBs 210 via a backhaul. The eNBs 210 may also communicate with one another, e.g., directly or indirectly via wireless or wireline backhaul.

The UEs 220 may be dispersed throughout the wireless network 200, and each UE may be stationary or mobile. A UE may also be referred to as a terminal, a mobile station, a subscriber unit, a station, a smart phone, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 2, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 3:
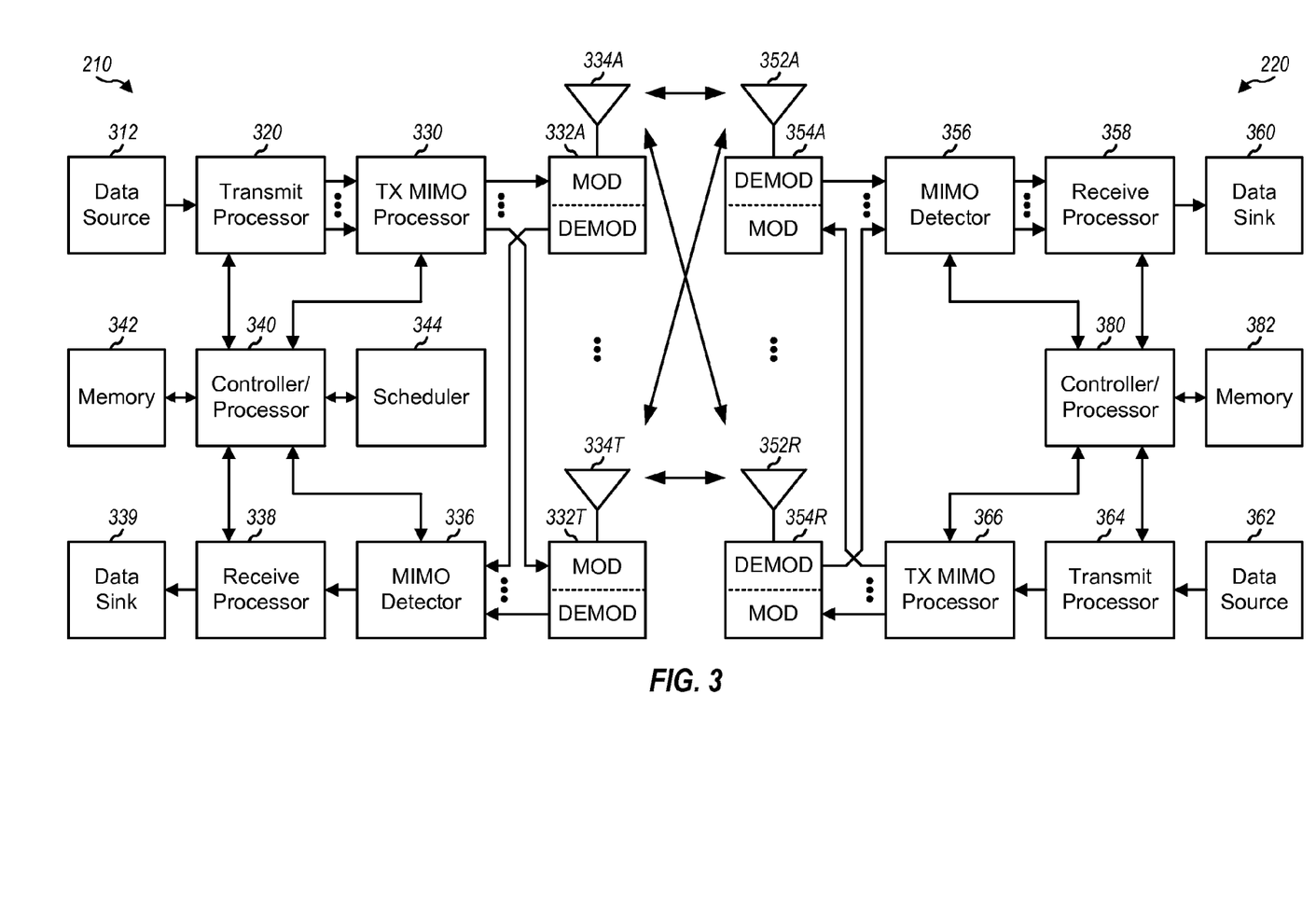
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 210 and a UE 220, which may be one of the base stations/eNBs and one of the UEs in FIG. 2. For example, the base station 210 may be the macro eNB 210c in FIG. 2, and the UE 220 may be the UE 220y. The base station 210 may also be a base station of some other type. The base station 210 may be equipped with antennas 334a through 334t, and the UE 220 may be equipped with antennas 352a through 352r. In an aspect, the base station 210, the UE 220, or both may be configured as a dual antenna or dual reception path receiver. The present methods may be particularly useful for a small cell base station in a self-organizing network, but are not limited to such applications. The base station 210 or UE 220 may include additional components (not shown) for performing the functions described herein, or in the alternative, depicted components may be adapted to perform these functions.

At the base station 210, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 220, the antennas 352a through 352r may receive the downlink signals from the base station 210 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 220 to a data sink 360, and provide decoded control information to a controller/processor 380.

On the uplink, at the UE 220, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 210. At the base station 210, the uplink signals from the UE 220 may be received by the antennas 334, processed by the demodulators 332, detected by a MIMO detector 336 if applicable, and further processed by a receive processor 338 to obtain decoded data and control information sent by the UE 220. The processor 338 may provide the decoded data to a data sink 339 and the decoded control information to the controller/processor 340.

The controllers/processors 340 and 380 may direct the operation at the base station 210 and the UE 220, respectively. The processor 380 and/or other processors and modules at the base station 210 or UE 220 may also perform or direct the execution of the functional blocks illustrated in FIGS. 4 and 5, and/or other processes for the techniques described herein. The memories 342 and 382 may store data and program codes for the base station 210 and the UE 220, respectively. A scheduler 344 may schedule UEs for data transmission on the downlink and/or uplink.

In one configuration, the UE 220 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Example Methodologies and Apparatus

In view of systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 4:
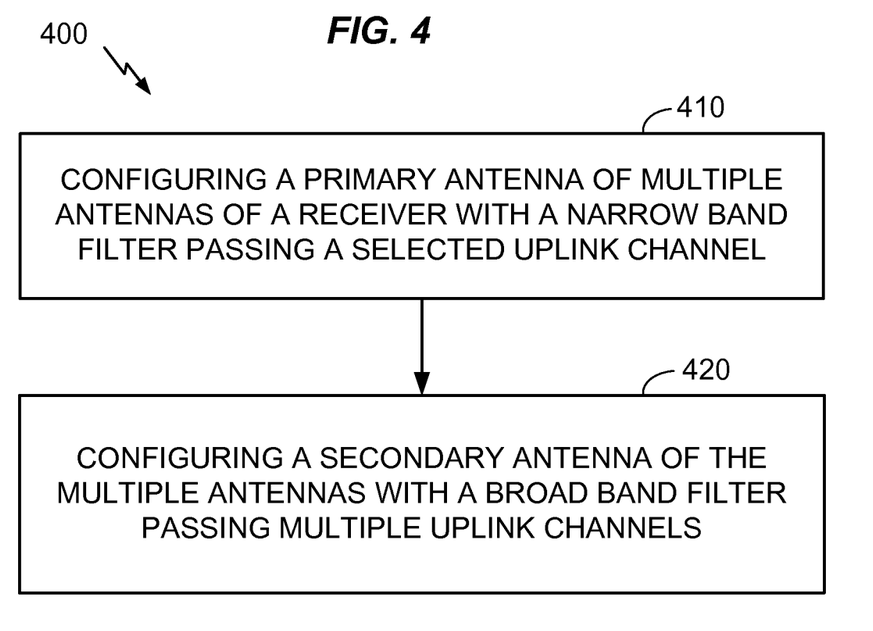
FIGS. 4-7 illustrate aspects of methodologies for configuring multiple antennas of a receiver.

FIG. 4 shows a method 400 for configuring multiple antennas of a receiver, for example a small cell in a self-organizing network. The cell may be in a neighborhood including one or more small cells comprising low power base stations (e.g., femto node, pico node, Home Node B, etc.) of a wireless communications network. The cell may be a macrocell, or a microcell. The method 400 may include, at 410, configuring a primary antenna of multiple antennas of a receiver with a narrow band filter passing a selected uplink channel. The primary antenna may be any selected one of the multiple antennas, for example an antenna on which the strongest uplink signal is detected. The configuring may include applying the narrow band filter configured to pass the selected channel and filter out other frequencies.

The method may include, at 420, configuring a secondary antenna of the multiple antennas with a broad band filter passing multiple uplink channels. The secondary antenna may be any selected one of the multiple antennas, for example, one on which a strongest uplink signal is not detected. Configuring the secondary antenna may include applying the broad band filter configured to pass two or more uplink channels, and more preferably, enough uplink channels to enable detection of uplink signals on a desired range of uplink channels. A desired range of channels may include, for example, all channels expected to be active, or possibly active, in a radio neighborhood of the cell that is configuring the secondary antenna. It shroud be apparent that the primary and secondary antennas belong to the same cell or receiver.

Figure 5:
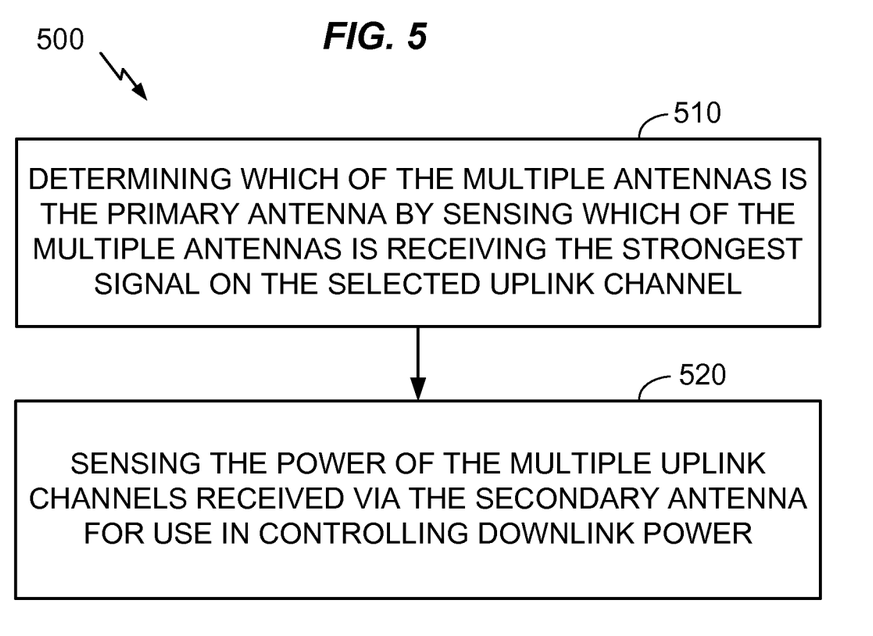
Figure 6:
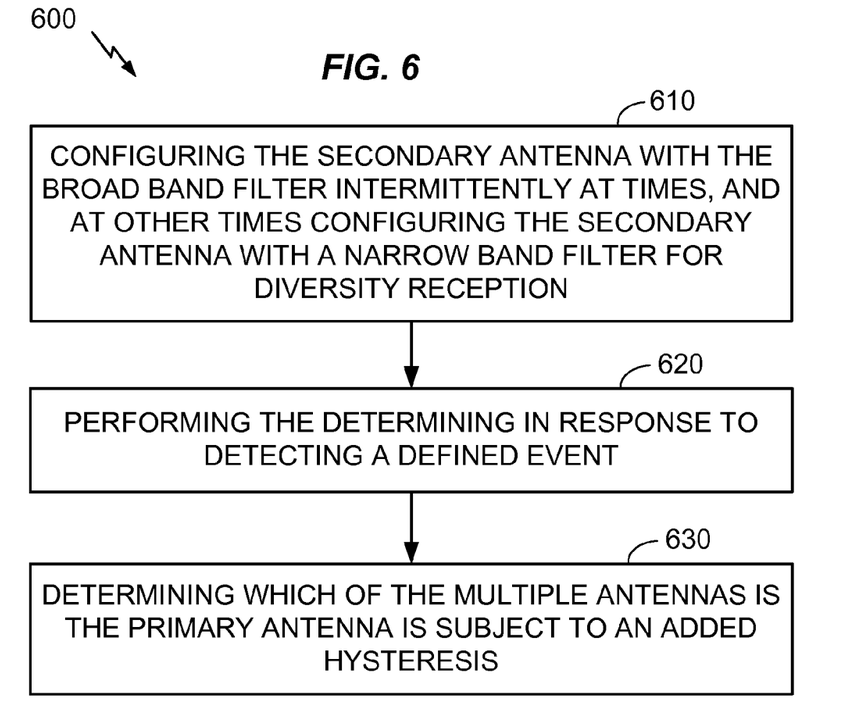
Figure 7:
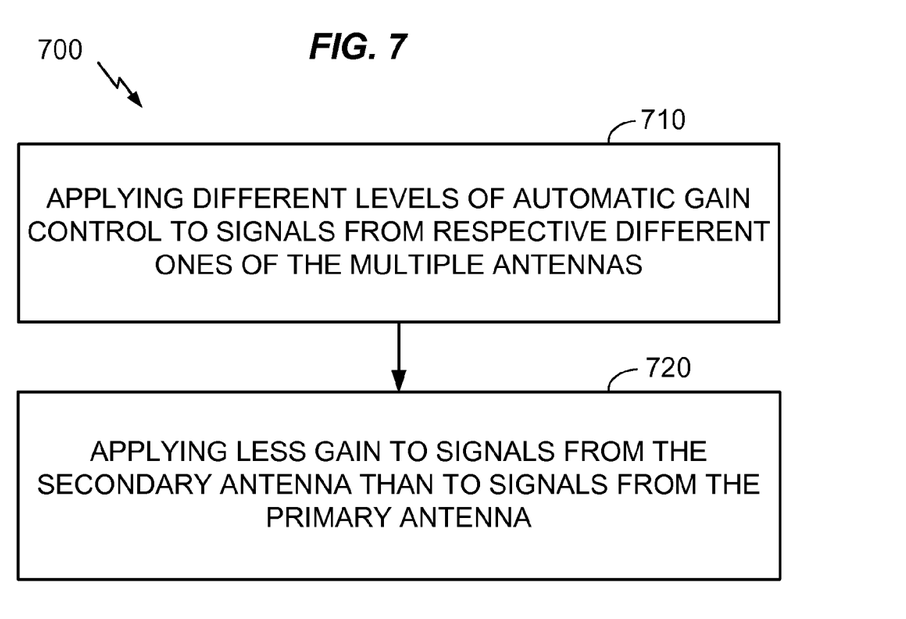

The method 400 may further include additional operations or execution of algorithms, for example, one or more of operations 500, 600, or 700 illustrated in FIGS. 5-7. Any one of these operations may be included as part of method 400, without necessarily requiring other upstream or downstream operations to also be included. Operations are grouped into different figures merely for illustrative convenience, and useful applications of the concepts disclosed herein are not limited to the illustrated groupings.

The method 400 may include one or more of the additional operations 500, shown in FIG. 5. For example, the method 400 may include, at 510, determining which of the multiple antennas is the primary antenna. For example, the cell may sense which of the multiple antennas is receiving the strongest signal on the selected uplink channel at a recent time or period, and designate that antenna as the primary antenna. Any suitable signal metric may be used to detect a strongest signal, for example, signal to noise ratio, received signal strength indicator, or other metric. In addition, the method 400 may include, at 520, sensing the power of the multiple uplink channels received via the secondary antenna. A resulting measure of power on different multiple uplink channels may be used by the cell in controlling downlink power. For example, downlink power may be moderated in proportion to a weakest usable uplink power, a strongest usable uplink power, or in in proportion to some aggregate (e.g., average or median) of multiple uplink powers.

The method 400 may include one or more of the additional operations 600, shown in FIG. 6. For example, the method 400 may include, at 610, configuring the secondary antenna with the broad band filter intermittently at times, and at other times configuring the secondary antenna with a narrow band filter for diversity reception. This may include, for example, the cell switching between use of the broad band filter and the narrow band filter on the secondary antenna, at predetermined intervals or in response to certain events.

The method 400 may include performing other operations periodically, or in response to events. For example, the determining operation 510 for selecting the primary antenna may be performed periodically, or as indicated at 620, in response to a defined event. A defined event may include, for example, a defined change in a number of connected users, a change in a downlink data load, a defined change in measurement report information, or other event. In another aspect, the determining operation 510 may be made subject to an added hysteresis, as indicated at 630. For example, to trigger a change in the designation of primary and secondary antennas, the signal strength at the secondary antenna may be required to exceed the strength at the primary antenna by at least a non-zero minimum amount and optionally, for at least a non-zero minimal length of time. Such minimum thresholds may be referred to as hysteresis factors and may be useful to prevent overly frequent switching of the primary and secondary antenna designations.

The method 400 may include one or more of the additional operations 700, shown in FIG. 7. For example, the method 400 may include, at 710, applying different levels of automatic gain control to signals from respective different ones of the multiple antennas. This may include, for example, applying less gain to signals from the secondary antenna than to signals from the primary antenna, as indicated at 720. The level of automatic gain controls for the different antennas may be controlled to optimize uplink reception while avoiding interference from blocker channels. When a blocker channel is received, the secondary antenna may use less gain with an associated higher noise figure and still provide diversity. Under this case, although the performance of the secondary antenna alone would not be of sufficient quality to pass MPS for a single antenna, it nonetheless may provide a diversity benefit for the receiver. Meanwhile, improved blocker detection for the primary antenna may be achieved by setting the primary antenna automatic gain ratio based on UL signal measurements from the secondary antenna. For example, the primary antenna gain may be set in inverse proportion to UL signal strength as measured at the secondary antenna. This may be beneficial, for example, for protecting the primary antenna receive path from undetectable saturation, in case of an unobserved blocker that is sensed by a wider-bandwidth secondary antenna path.

Figure 8:
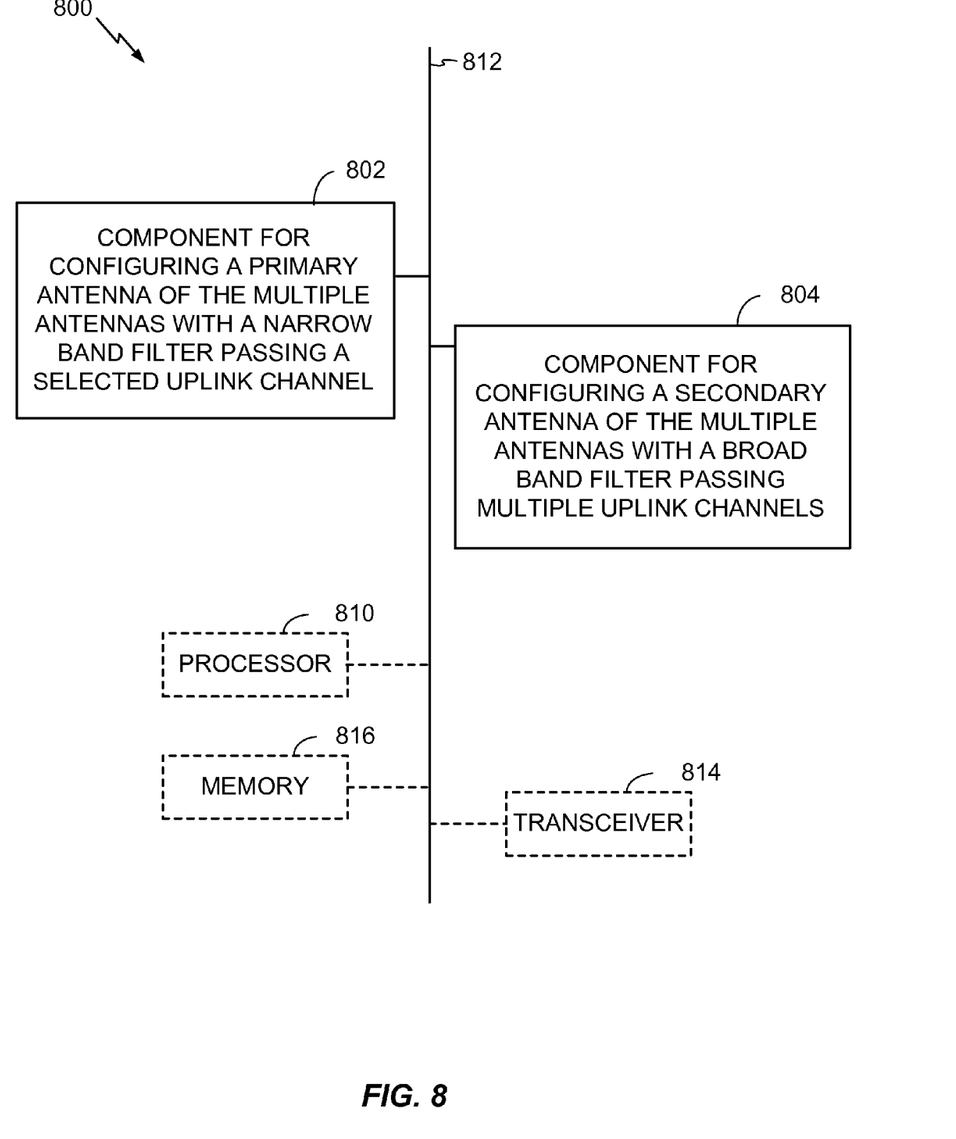
FIG. 8 illustrates aspects of an apparatus for configuring multiple antennas of a receiver, in accordance with the methodologies of FIGS. 4-7.

The operations of method 400 may be performed by a suitable apparatus. With reference to FIG. 8, there is depicted an apparatus 800 that may be configured as a cell configuring multiple antennas in a wireless network, or as a processor or similar device for use within the cell. The apparatus 800 may include functional blocks that can represent functions implemented by a processor, software, hardware, or combination thereof (e.g., firmware).

As illustrated, in one embodiment, the apparatus 800 may include an electrical component or module 802 for configuring a primary antenna of the multiple antennas with a narrow band filter passing a selected uplink channel. For example, the electrical component 802 may include at least one control processor coupled to a transceiver or the like and to a memory with instructions for selecting a primary antenna and processing a received analog signal using a narrow band filter. The component 802 may be, or may include, a means for configuring a primary antenna of the multiple antennas with a narrow band filter passing a selected uplink channel. Said means may include the control processor executing an algorithm for configuring a primary antenna of the multiple antennas with a narrow band filter passing a selected uplink channel, for example, any suitable band-pass algorithm as known in digital signal processing wherein the center frequency is set to the center of the selected uplink channel and the bandwidth is set to the bandwidth of the selected uplink channel. The selected uplink channel may be any channel on which the cell is receiving, or attempting to receive, a data signal.

The apparatus 800 may include an electrical component 804 for configuring a secondary antenna of the multiple antennas with a broad band filter passing multiple uplink channels. For example, the electrical component 804 may include at least one control processor coupled to a transceiver or the like and to a memory holding instructions for applying a broad band filter passing multiple uplink channels to analog signals from the secondary antenna. The component 804 may be, or may include, a means for configuring a secondary antenna of the multiple antennas with a broad band filter passing multiple uplink channels. Said means may include the control processor executing an algorithm for configuring a secondary antenna of the multiple antennas with a broad band filter passing a multiple uplink channels. For example, the filter may include any suitable band-pass algorithm as known in signal processing wherein the center frequency is set to a center frequency of the multiple uplink channels and the bandwidth is set to or otherwise related to a difference between the highest frequency one of the uplink channels and a lowest frequency one of the uplink channels. This may include, for example, identifying the multiple uplink channels based on a detected and/or assumed network neighborhood.

In related aspects, the apparatus 800 may optionally include a processor component 810 having at least one processor, in the case of the apparatus 800 configured as a network entity. The processor 810, in such case, may be in operative communication with the components 802-804 or similar components via a bus 812 or similar communication coupling. The processor 810 may effect initiation and scheduling of the processes or functions performed by electrical components 802-804. The processor 810 may encompass the components 802-804, in whole or in part. In the alternative, the processor 810 may be separate from the components 802-804, which may include one or more separate processors.

In further related aspects, the apparatus 800 may include a radio transceiver component 814 coupled to at least two separate receiving antennas (not shown). A stand alone receiver and/or stand alone transmitter may be used in lieu of or in conjunction with the transceiver 814. In the alternative, or in addition, the apparatus 800 may include multiple transceivers or transmitter/receiver pairs, which may be used to transmit and receive on different carriers. The apparatus 800 may optionally include a component for storing information, such as, for example, a memory device/component 816. The computer readable medium or the memory component 816 may be operatively coupled to the other components of the apparatus 800 via the bus 812 or the like. The memory component 816 may be adapted to store computer readable instructions and data for performing the activity of the components 802-804, and subcomponents thereof, or the processor 810, or the methods disclosed herein. The memory component 816 may retain instructions for executing functions associated with the components 802-804. While shown as being external to the memory 816, it is to be understood that the components 802-804 can exist within the memory 816.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more examples disclosed herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available non-transitory media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually encode data magnetically, while "discs" customarily refer to media encoded optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and features disclosed herein.

What is claimed is:

1. A method for configuring multiple antennas of a receiver, the method comprising:
   determining a primary antenna of the multiple antennas by sensing which of the multiple antennas is receiving the strongest signal on a selected uplink channel;
   configuring the primary antenna with a narrow band filter passing the selected uplink channel;
   configuring a secondary antenna of the multiple antennas with a broad band filter passing multiple uplink channels intermittently to perform uplink measurements at first times; and
   configuring the secondary antenna with a narrow band filter to provide diversity reception at second times, wherein the first times and the second times are different times.

2. The method of claim 1, the uplink measurements further comprising sensing the power of the multiple uplink channels received via the secondary antenna for use in controlling downlink power.

3. The method of claim 1, further comprising performing the determining in response to detecting a defined event.

4. The method of claim 1, wherein determining which of the multiple antennas is the primary antenna is subject to added hysteresis.

5. The method of claim 1, further comprising applying different levels of automatic gain control to signals from respective different ones of the multiple antennas.

6. The method of claim 5, wherein less gain is applied to signals from the secondary antenna than to signals from the primary antenna.

7. The method of claim 1, wherein the receiver comprises an access point.

8. An apparatus for configuring multiple antennas of a receiver, the apparatus comprising:
   means for determining a primary antenna of the multiple antennas by sensing which of the multiple antennas is receiving the strongest signal on a selected uplink channel;
   means for configuring the primary antenna with a narrow band filter passing the selected uplink channel; and
   means for configuring a secondary antenna of the multiple antennas, wherein the secondary antenna is configured with a broad band filter passing multiple uplink channels intermittently to perform uplink measurements at first times, and wherein the secondary antenna is configured with a narrow band filter to provide diversity reception at second times, wherein the first times and the second times are different times.

9. An apparatus for configuring multiple antennas of a receiver, comprising:
   at least one processor configured for determining a primary antenna of the multiple antennas by sensing which of the multiple antennas is receiving the strongest signal on a selected uplink channel, configuring a primary antenna with a narrow band filter passing the selected uplink channel, for configuring a secondary antenna of the multiple antennas with a broad band filter passing multiple uplink channels intermittently to perform uplink measurements at first times, and configuring the secondary antenna with a narrow band filter to provide diversity reception at second times, wherein the first times and the second times are different times; and
   a memory coupled to the at least one processor for storing data.

10. The apparatus of claim 9, wherein the processor is further configured for performing the uplink measurements by sensing the power of the multiple uplink channels received via the secondary antenna for use in controlling downlink power.

11. The apparatus of claim 9, wherein the processor is further configured for performing the determining in response to detecting a defined event.

12. The apparatus of claim 9, wherein the processor is further configured for determining which of the multiple antennas is the primary antenna is subject to an added hysteresis.

13. The apparatus of claim 9, wherein the processor is further configured for applying different levels of automatic gain control to signals from respective different ones of the multiple antennas.

14. The apparatus of claim 13, wherein the processor is further configured for applying less gain to signals from the secondary antenna than to signals from the primary antenna.

15. The apparatus of claim 9, wherein the processor comprises a part of an access point.

16. A non-transitory computer-readable medium holding instructions, that when executed by a processor, cause a computer to:
   determine a primary antenna of multiple antennas of a receiver by sensing which of multiple antennas is receiving the strongest signal on a selected uplink channel;
   configure a primary antenna of the multiple antennas with a narrow band filter passing a selected uplink channel;
   configure a secondary antenna of the multiple antennas with a broad band filter passing multiple uplink channels intermittently to perform uplink measurements at first times; and
   configure the secondary antenna with a narrow band filter to provide diversity reception at second times, wherein the first times and the second times are different times.

* * * * *